United States Patent
Silva et al.

(10) Patent No.: US 8,715,790 B2
(45) Date of Patent: May 6, 2014

(54) PRODUCTION OF CARBON NANOTUBES

(75) Inventors: Sembukutiarachilage Ravi Silva, Camberly (GB); Sajad Haq, Glasgow (GB); Bojan O. Boskovic, St. Peters (GB)

(73) Assignee: University of Surrey, Surrey (GB)

( * ) Notice: Subject to any disclaimer, the term of this patent is extended or adjusted under 35 U.S.C. 154(b) by 1821 days.

(21) Appl. No.: 10/484,894

(22) PCT Filed: Jul. 26, 2002

(86) PCT No.: PCT/GB02/03438
§ 371 (c)(1),
(2), (4) Date: Aug. 4, 2004

(87) PCT Pub. No.: WO03/011755
PCT Pub. Date: Feb. 13, 2003

(65) Prior Publication Data
US 2004/0253167 A1    Dec. 16, 2004

(30) Foreign Application Priority Data

| Jul. 27, 2001 | (GB) | ................................. | 0118276.5 |
| Jul. 27, 2001 | (GB) | ................................. | 0118279.9 |
| Jul. 27, 2001 | (GB) | ................................. | 0118341.7 |

(51) Int. Cl.
*H05H 1/24*        (2006.01)
(52) U.S. Cl.
USPC .......................................... 427/577; 427/569
(58) Field of Classification Search
None
See application file for complete search history.

(56) References Cited

U.S. PATENT DOCUMENTS

| 5,501,877 | A | * | 3/1996 | Adair et al. | ................. | 427/249.9 |
| 5,510,098 | A | * | 4/1996 | Chow | ........................ | 423/445 B |
| 5,753,088 | A | * | 5/1998 | Olk | .............................. | 204/173 |
| 5,780,101 | A | * | 7/1998 | Nolan et al. | .................. | 427/216 |
| 5,874,807 | A | * | 2/1999 | Neger et al. | .............. | 315/111.41 |
| 6,100,628 | A | * | 8/2000 | Coll et al. | ...................... | 313/310 |
| 6,129,901 | A | * | 10/2000 | Moskovits et al. | ........ | 423/447.3 |
| 6,156,256 | A | * | 12/2000 | Kennel | ........................ | 264/461 |
| 6,221,330 | B1 | | 4/2001 | Moy et al. | | |
| 6,325,909 | B1 | * | 12/2001 | Li et al. | .......................... | 205/106 |
| 6,346,303 | B1 | * | 2/2002 | Shih et al. | ..................... | 427/571 |
| 6,440,763 | B1 | * | 8/2002 | Hsu | ............................... | 438/20 |
| 6,495,258 | B1 | * | 12/2002 | Chen et al. | .................... | 428/408 |

(Continued)

FOREIGN PATENT DOCUMENTS

| EP | 1 129 990 A1 | 9/2001 |
| EP | 1 190 987 A1 | 3/2002 |

(Continued)

OTHER PUBLICATIONS

Show et al, Formation of Carbon Nanotube by using RF Plasma CVD equipment from Acetylene and Hydrogen Gases, Nov. 2000, Materials Research Society, vol. 63, pp. a13121-a13126.*

(Continued)

*Primary Examiner* — David Turocy
*Assistant Examiner* — Michael G Miller
(74) *Attorney, Agent, or Firm* — Sterne, Kessler, Goldstein & Fox P.L.L.C.

(57) ABSTRACT

A method of forming carbon nanotubes by plasma enhanced chemical vapor deposition using a carbon containing gas plasma, wherein the carbon nanotubes are not formed on a substrate at a temperature 300° C. or above.

41 Claims, 9 Drawing Sheets

(56) References Cited

U.S. PATENT DOCUMENTS

| 6,863,942 | B2* | 3/2005 | Ren et al. | 428/36.9 |
|---|---|---|---|---|
| 2001/0050219 | A1* | 12/2001 | Anazawa et al. | 204/173 |
| 2002/0090331 | A1* | 7/2002 | Smalley et al. | 422/198 |
| 2005/0115821 | A1 | 6/2005 | Shi et al. | |

FOREIGN PATENT DOCUMENTS

| EP | 1190987 | 3/2002 |
|---|---|---|
| TW | 444067 | 7/2001 |
| WO | WO 99/65821 A1 | 12/1999 |
| WO | WO 03/011755 A1 | 2/2003 |
| WO | WO 03/064321 A1 | 8/2003 |

OTHER PUBLICATIONS

Kumar et al, "Realization of different carbon nanostructures by a microwave plasma enhanced chemical vaopr deposition technique", Oct. 2001, Applied Surface Science, vol. 182, pp. 326-332.*

Hong et al, "In-situ synthesis of carbon nanotubes on organic polymer substrates at atmospheric pressure", JMay 2002, Advanced Materials, vol. 19, pp. 676-679.*

European Patent Office. PCT International Preliminary Examination Report. International Application No. PCT/GB02/03438. International Filing Date: Jul. 26, 2002. Applicant: University of Surrey. 16 pages. Dec. 29, 2003.

Liang, Gou-Tsau et al. "Growth of Diamond Films and Carbon Nanotubes." Hollow Cathode Plasma-enhanced Chemical Vapor Deposition. 1990. Chinese Language Text. English Language Translation inscribed on p. 3.

Chao-Lin, Lee et al. "Carbon Nanostructures Synthesized." Microwave Enhanced Chemical Vapor Deposition. Chinese Language Text. English Language Translation inscribed on p. 1-2.

Bower, C. et al. "Fabrication and Field Emission Properties of Carbon Nanotube Cathodes." Mat. Res. Soc. Symp. Proc. vol. 593. pp. 215-220. ed. J. Sullivan, J. Robertson, O. Zhou, T. Allen, and B. Coll. 2000.

Show et al., "Formation of Carbon Nanotube by using RF Plasma CVD Equipment from Acetylen and Hydrogen Gases", Nanotubes and Related Materials, Materials Research Society Symposium—Proceedings 2001, vol. 633, Nov. 27, 2000.

Colomer, et al., "Purification of Catalytically Produced Multi-Wall Nanotubes", Journal of the Chemical Society, Faraday Transactions, Royal Society of Chemistry, vol. 94, No. 24, pp. 3753-3758, Dec. 21, 1998.

Vigolo et al., "Macropscopic Fibers and Ribbons of Oriented Carbon Nanotubes", Science, American Assoc. Adv. Science, vol. 290, No. 5495, pp. 1331-1334, Nov. 17, 2000.

Jae-Hoon et al., "Preparation of Carbon Nanotubes on Ni/Fe Alloy Substrate and Their Application", IDW'00, Proceedings of the Seventh International Display Workshops Proceedings of 7th International Display Workshops, pp. 1023-1026, Nov. 29, 2000.

Kumar, et al., "Realization of Different Carbon Nanostructures by a Microwave Plasma Enhanced Chemical Vapor Deposition Technique", Applied Surface Science, vol. 182, No. 3-4, pp. 326-332, Oct. 22, 2001.

Sano, et al., "Self-organization of PEO-Graft-Single-Walled Carbon Nanotubes in Solutions and Langmuir-Blodgett Films", Langmuir, American Chem. Soc, vol. 17, No. 17, pp. 5125-5128, Aug. 21, 2001.

Hong, et al., "In-Situ Synthesis of Carbon Nanotubes on Organic Polymer Substrates at Atmospheric Pressure", Advanced Materials, vol. 14, No. 9, pp. 676-679, May 3, 2002.

Chul, et al., "Low Temperature Synthesis of Carbon Nanotubes by Microwave Plasma-Enhanced Chemical Vapor Deposition", Synthetic Metals, vol. 108, No. 2, pp. 159-163, Jan. 17, 2000.

Kang et al, "Low Temperature Growth of Multi-Wall Carbon Nanotubes Assisted by Mesh Potential Using a Modified Plasma Enhanced Chemical Vapor Deposition System", Chemical Physics Letters, vol. 349, No. 3-4, pp. 196-200, Nov. 30, 2001.

Wang et al, "Synthesis of Multi-Walled Carbon Nanotubes by Microwave Plasma-Enhanced Chemical Vapor Deposition", Thin Solid Films, vol. 390, No. 1-2, pp. 130-133, Jun. 30, 2001.

Ebbesen, Thomas, "Production and Purification of Carbon Nanotubes", Carbon Nanotubes: Preparation and Properties, CRC Press Series on Discrete Mathematics and Its Applications, pp. 154-159.

Iijima, Sumio, "Helical Microtubules of Graphitic Carbon", Nature, vol. 354, pp. 56-58, Nov. 7, 1991.

Collins et al., "Nanotubes for Electronic", Scientific American, pp. 62-69, Dec. 2000.

Thess et al., "Crystalline Ropes of Metallic Carbon Nanotubes", Science Reports, vol. 273 pp. 483-487, Jul. 26, 1996.

Li, et al, "Tensile Strength of Single-Walled Carbon Nanotubes Directly Measured from their Macroscopic Ropes", 2000: American Institute of Physics, Applied Physics Letter, vol. 77, Issue 20, Nov. 13, 2000.

Cheng, et al., "Bulk Morphology and Diameter Distribution of Single-Walled Carbon Nanotubes Synthesised by Catalytic Decomposition of Hydrocarbons", Chemical Physics Letters, vol. 289, pp. 602-610, 1998.

Kang, Nam Seok, "Method for Preparing Field Emission Microelectronic Device", Korean Publication No. KR20010057162, published Jul. 4, 2001, abstract only.

* cited by examiner 5A    5B

7A

7B

PRODUCTION OF CARBON NANOTUBES

The present invention relates to a method of making carbon nanotubes, in particular a method of forming carbon nanotubes using plasma enhanced chemical vapour deposition (PECVD). The term 'carbon nanotubes' (CNTs) is used herein as a generic term to embrace single-walled and multi-walled carbon nanotubes, carbon nanofibres, carbon nanofilaments and carbon nanoropes (ropes of carbon nanotubes).

The existence of CNTs is well documented in academic literature, since 1991 when Iijima first observed them in carbon arc deposits (Iijima S., Nature, 354 (1991) 56). There are many different ways of making them, including arc discharge, laser vaporisation, electron beam and catalytic pyrolosis. Other known methods are to use chemical vapour deposition (CVD) and plasma enhanced CVD (PECVD).

Background information discussing CNTs is disclosed in prior art document 'Nanotubes for electronics' in the December 2000 issue of Scientific American (P. G. Collins et al.) pp. 38-45. This document discloses a method of CNT production, wherein a substrate is placed in a vacuum oven or flow tube, heated to temperatures of the order of 500° C. to 1200° C. and a carbon-containing gas such as methane is introduced optionally in the presence of a transition metal-containing catalyst, whereupon it decomposes into, inter alia, carbon vapour. Some of the carbon vapour forms or condenses as carbon nanotubes.

Other prior art documents concerned with CNT production are 'Crystalline Ropes of Metallic Carbon Nanotubes' in Science, Reports pp. 483-487, vol 273, 26 Jul. 1996; 'Tensile strength of single walled carbon nanotubes directly measured from their macroscopic ropes', Applied Physics Letters, Vol 77, No 20, 13 Nov. 2000; and 'Bulk Morphology and diameter distribution of single-walled carbon nanotubes synthesised by catalytic decomposition of hydrocarbons', chemical physics letters, 289 (1998) 602-610.

A further technique for growing CNTs is disclosed in the International patent application WO 99/65821, wherein a method of forming CNTs on materials such as glass, silica, quartz and silicon using Plasma Enhanced Chemical Vapour Deposition (PECVD) is disclosed. This 'hot filament' PECVD method uses high gas temperatures of between 300° C. and 700° C., so as to deposit CNTs on, for example, glass having a strain point temperature of 666° C. A heat filament situated above the material directly heats the material on to which the CNTs are deposited, the heat filament providing the energy required to produce the plasma above the substrate, and therefore provide the mechanism to disassociate the hydrocarbon gas and form CNTs using a catalyst. The glass onto which CNTs are deposited can then be used in the production of flat panel displays.

CNTs have other known applications, such as hydrogen storage devices. This application is particularly suited to CNTs as $H_2$ is approximately 0.28 nm in diameter, whereas the approximate distance between graphene layers in multi-walled CNTs is approximately 0.34 nm. Thus, CNTs provide a means of storing $H_2$ in an efficient manner for use in fuel cells.

It is also possible to use CNTs in applications such as electrochemical capacitors (super-capacitors), nanoelectronics, electronic and photonic device applications, field emission devices, polymer composite fabrication, MEM's (micro electromechanical systems), microwave resonators, structural materials, and electronic semiconductor materials. A composite material could consist of glass, metal, ceramic, polymer, graphite and a mixture of any of these.

In known polymer composite fabrication techniques, CNTs are grown in a chamber using a known high temperature technique. The CNTs are removed from the chamber by, for example, scraping the CNTs off the chamber wall. The CNTs are then mixed with the polymer to provide a strengthened composite material.

A further example of CNT production is given in EP1129990A1, wherein a method is disclosed using high frequency, R.F. and microwave PECVD to deposit CNTs on a substrate heated to a temperature between 500° C. and 1000° C.

All of these prior methods have substantial substrate temperatures, ranging from 300° C. up to and above 1000° C., for the necessary energy input required to produce CNTs.

The present invention has been devised and modified to provide an improved low temperature, in particular room temperature, PECVD process for the formation and growth of CNTs. With the present invention it is now possible to deposit CNTs onto substrates at much lower temperatures than previously carried out, providing an increase in the commercial potential of CNT production, especially where CNTs are applied to commercially significant materials that could not be used with the known high temperature methods of deposition.

According to this invention, there is provided a method of forming carbon nanotubes by plasma enhanced chemical vapour deposition using a carbon containing gas plasma, wherein the carbon nanotubes are not formed on a substrate at a temperature 300° C. or above.

Other aspects and embodiments are as described or claimed hereafter.

In order that the invention may be illustrated, more easily appreciated and readily carried into effect by those skilled in the art, embodiments thereof will now be described by way of non-limiting example only, with reference to the accompanying drawings in which.

Figure 5:
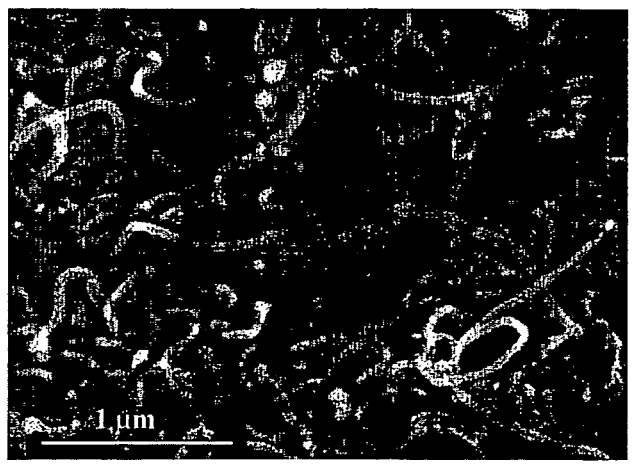
Figure 5:
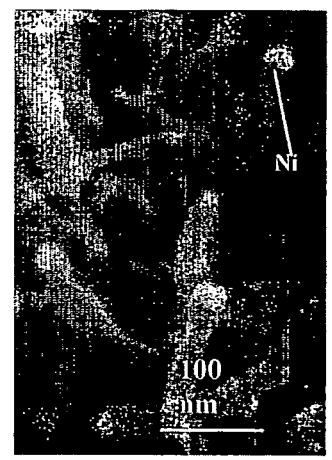
Figure 6:
Figure 7:
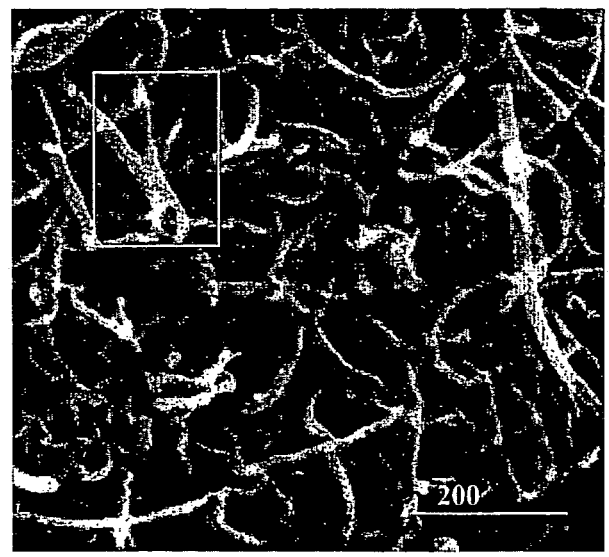
Figure 7:
Figure 8:
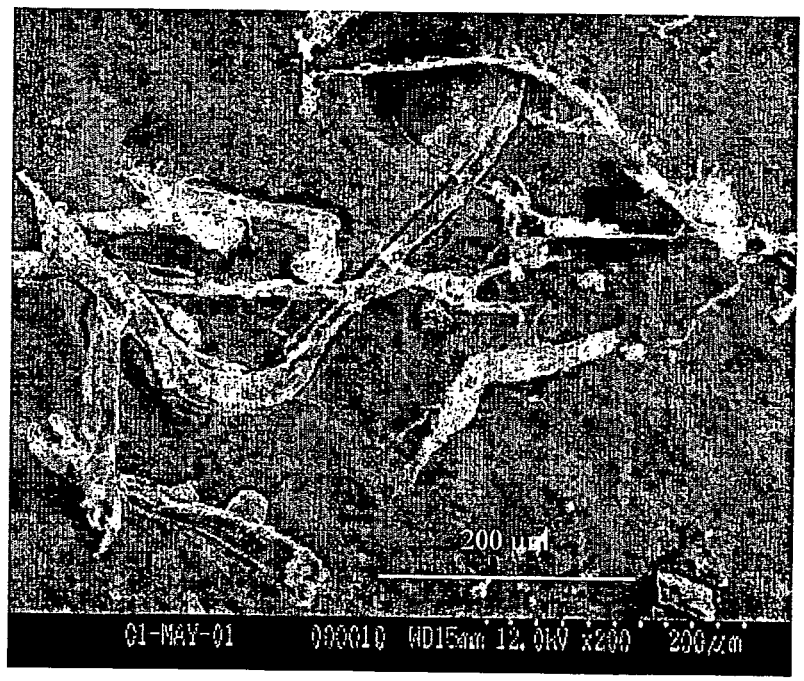
Figure 9:

FIG. 5, consisting of FIGS. 5A and 5B, shows SEM pictures of CNTs formed in example 9 using combined radio-frequency and microwave plasma enhanced CVD;

FIG. 6 is a TEM picture of CNTs exhibiting bi-directional growth, formed in example 10, using combined radio-frequency and microwave plasma enhanced CVD;

FIG. 7, consisting of FIGS. 7A and 7B, shows TEM pictures of CNTs exhibiting branching at a 'Y'-shaped junction, formed in example 11, using combined radio-frequency and microwave plasma enhanced CVD;

FIG. 8 is an SEM picture of ropes of CNTs produced (as bundles of closely packed nanotubes), formed in example 12 after nitric acid treatment, using combined radio-frequency and microwave plasma enhanced CVD; and FIG. 9 is an SEM picture of ropes of CNTs produced (as bundles of densely packed nanotubes) after nitric acid treatment using combined radio-frequency and microwave plasma enhanced CVD.

DESCRIPTION OF PREFERRED EMBODIMENT

Figure 1:
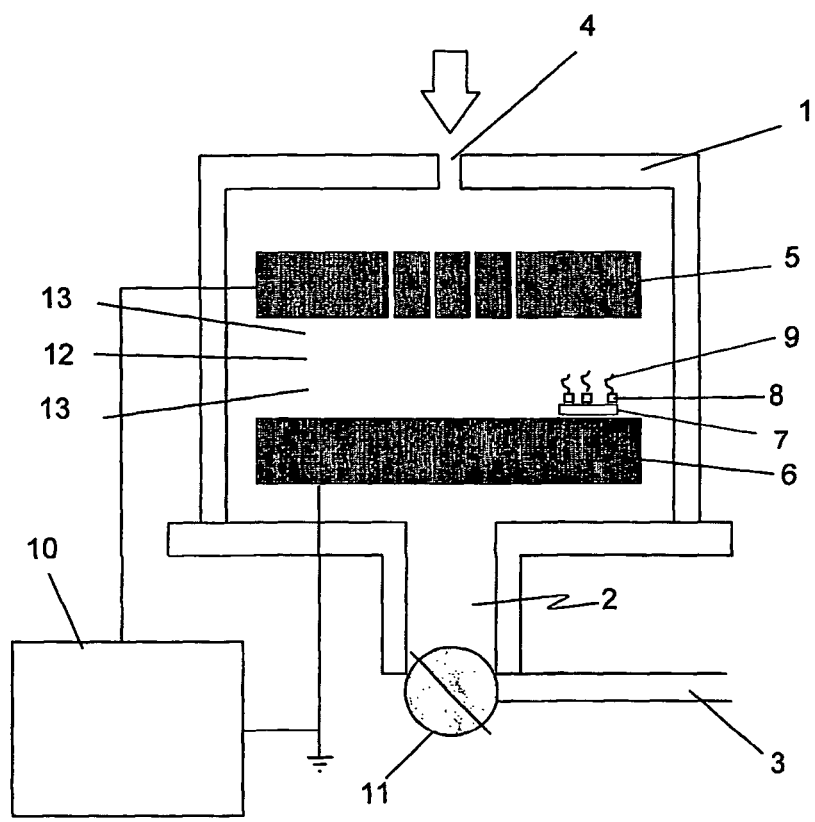
FIG. 1 is a schematic illustration of a suitable radio-frequency plasma chamber for forming and growing CNTs upon a substrate, according to an embodiment of the present invention.

Referring firstly to FIG. 1, the plasma chamber of a Plasma Technology DP800 radio-frequency PECVD system is used as shown diagrammatically. A vacuum chamber housing 1 is capable of evacuation via channels 2 and 3 controlled by an auto pressure throttle valve 11. Evacuation of the interior of the chamber 1 is effected via a roots/rotary pump in communication with channel 3. The chamber 1 has a gas inlet 4 for receiving a flow of the required gas or gaseous mixture, typically a hydrocarbon gas such as methane $CH_4$.

An earthed electrode 6 is provided in the lower part of the chamber, whilst a powered electrode 5 is provided in the upper part of the chamber and connected to the appropriate power source. In this embodiment, the power source used is a 13.56 MHz radio-frequency power supply unit (PSU) 10.

A substrate 7 is coated with a nickel powder (99% purity) with an average particle diameter from 4 to 7 μm obtained from Goodfellow Cambridge Ltd. The substrate used in this embodiment is a graphite plate substrate, but it will be obvious to a skilled person that any other substrate may be used. Approximately 50 mg of the nickel powder catalyst was dispersed as a uniform thin layer on the top of the substrate.

The substrate is placed on the earthed electrode and the chamber is evacuated. The substrate 7 is shown in FIG. 1 coated with ultrafine nickel powder 8 (shown in exaggerated form in the Figure) upon which the CNTs 9 (shown in exaggerated form in the Figure) are formed. Methane gas of 99.999% (five 9s) purity is allowed to flow into the chamber at a rate of 30 sccm ($cm^3$/minute), using a suitable device such as a mass flow controller. Radio-frequency power is switched on at a power setting of 300 W in order to strike a plasma. After the plasma is struck, the gas flow rate is adjusted to provide a working pressure of approximately 133.3 Pascal (1 Torr) and the radio-frequency power supply 10 is adjusted to operate at 200 W to maintain the plasma 12. The plasma has a sheathed region 13 in which the substrate 7 is situated. The substrate 7 may be subjected to only a low potential difference e.g. of the order less than 40V, preferably less than 20V to facilitate a gentle growth process for the carbon nanotubes. The potential difference to some extent determines the direction of growth and alignment of the CNTs.

It is the very high temperature of the plasma that provides the necessary energy to produce the required reaction of the gases in the chamber, thereby allowing the radio-frequency system to transport the disassociated hydrocarbon species and carbon ions to the substrate and initialise the CNT growth from the catalyst. The plasma temperature is approximately 2-3 eV, which equates to approximately 24000 to 36000 Kelvin.

The electrodes 5, 6 are temperature controlled by using a combination of a water-cooling system (not shown) and heaters so, as the plasma is generated and maintained, the electrodes are kept at the desired temperature. The temperature of the substrate on the electrodes during a plasma in this embodiment is between 29° C. and 32° C. This low temperature substrate temperature allows for a wide variety of previously unused substrates to be used for CNT deposition.

During different process runs carried out, various temperatures ranging from room temperature to 250° C. were used. Although it will be clear to a skilled person that higher temperatures could be used. Also, various process times were used from 10 to 30 minutes A sample of process parameters from eight separate runs using the apparatus shown in FIG. 1 is shown in Table 1 as Examples 1 to 8.

TABLE 1

| Example | Catalyst | Substrate | Hydrocarbon | Radio Frequency | Time | Microwave Energy | Temp |
|---|---|---|---|---|---|---|---|
| 1 | Ni powder 4-7 μm | Graphite | $CH_4$ f = 30 sccm 99.9% pure | 13.56 MHz, 200 w | 30 min | None | 30° C. |
| 2 | Ni powder 4-7 μm | Graphite | $CH_4$ f = 30 sccm 99.9% pure | 13.56 MHz, 200 w | 15 min | None | 250° C. |
| 3 | Ni powder 4-7 μm | Graphite | $CH_4$ f = 30 sccm 99.9% pure | 13.56 MHz, 200 w | 15 min | None | 250° C. |
| 4 | Ni powder 4-7 μm | Graphite | $CH_4$ f = 30 sccm 99.9% pure | 13.56 MHz, 200 w | 30 min | None | 30° C. |
| 5 | Ni powder 4-7 μm | Plastics | $CH_4$ f = 30 sccm 99.9% pure | 13.56 MHz, 200 w | 30 min | None | 30° C. |
| 6 | Ni powder 4-7 μm | Silicon | $CH_4$ f = 30 sccm 99.9% pure | 13.56 MHz, 200 w | 30 min | None | 100° C. |

TABLE 1-continued

| Example | Catalyst | Substrate | Hydrocarbon | Radio Frequency | Time | Microwave Energy | Temp |
|---|---|---|---|---|---|---|---|
| 7 | Ni powder 4-7 μm | Plastics | CH₄f = 30 scm 99.9% pure | 13.56 MHz, 200 w | 30 min | None | 30° C. |
| 8 | Ni powder 4-7 μm | Plastics | CH₄f = 30 scm 99.9% pure | 13.56 MHz, 200 w | 30 min | None | 30° C. |

The characterisations of the nanotubes formed were performed on a Hitachi S-4000 field emission scanning electron microscope (SEM) and a Philips CM 200 transmission electron microscope (TEM). The samples studied by TEM were prepared by ultrasonic dispersion of 'as grown' samples in isopropanol, a drop of the suspension was then deposited on a thin amorphous carbon film supported on a copper grid. The samples were then allowed to dry.

Figure 3:
FIG. 3 is a typical scanning electron micrograph (SEM) of CNTs produced at room temperature in radio-frequency methane plasma on Ni catalyst particles, according to an embodiment of the present invention.
Figure 4:
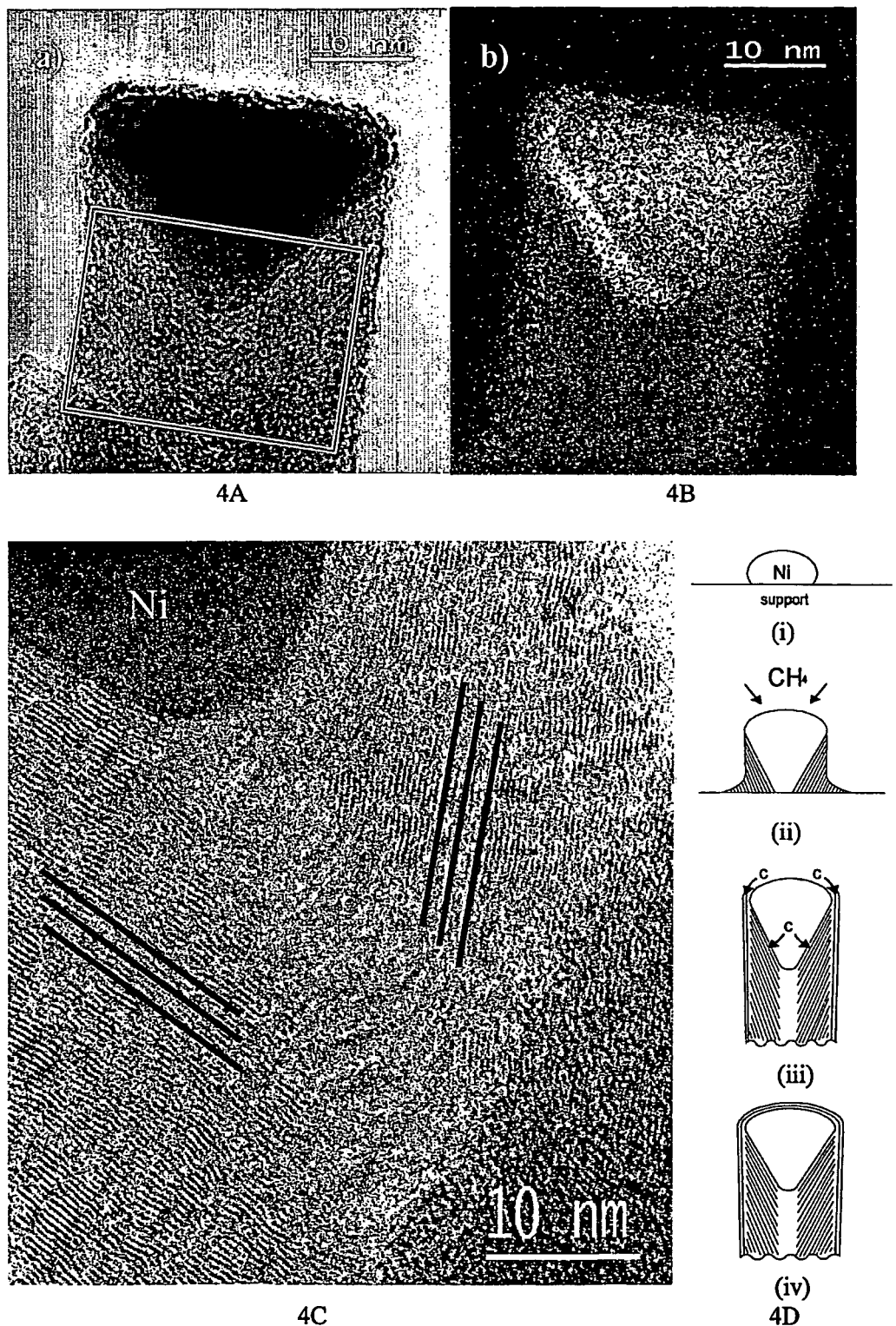
FIG. 4A is a typical transmission electron micrograph (TEM) of an radio-frequency PECVD produced nanotube containing a terminal nickel particle, produced according to an embodiment of the present invention.
FIG. 4B is an energy filtered TEM image showing a nickel map, indicating the nickel content (in white) at the tip of a nanotube produced according to an embodiment of the present invention.
FIG. 4C is a close up of the TEM shown in FIG. 4A, indicating the herringbone structure of the CNTs produced according to an embodiment of the present invention.
FIG. 4D shows the proposed method of formation of the CNTs produced according to an embodiment of the present invention.

An SEM micrograph of example 1 showing carbon nanotubes grown on a substrate kept at room temperature in an radio-frequency plasma-enhanced CVD is provided in FIG. 3. FIG. 3 shows nickel catalyst particles at the end of the CNTs, as white spots, suggesting a tip growth model. The tip growth model is depicted in stages (i) to (iv) in FIG. 4D. TEM studies have shown the multi-walled nature of the produced nanotubes with the associated catalyst particle at the tip, as shown in FIG. 4A. FIG. 4B shows the nickel content at the tip of the CNT, using an energy filtered TEM image showing a nickel map.

The interlayer spacing of 0.34 nm typical for graphene sheets along the CNT axis was found in the expanded region of the nanotube. The typical lengths of carbon nanotubes produced varied from 0.5 to 5 μm, with diameters ranging from 5 to 15 nm. Adjusting the deposition times, gas flows, catalyst particle conditions, gas concentrations & type, and D.C. bias applied to the substrate may vary the length and thickness of CNTs.

FIG. 4C shows a TEM structure analysis of the carbon nanotubes The TEM shows graphite platelets, which are usually aligned parallel to the side facets of the cone-shaped catalyst particle in the form of a "herringbone" stacking arrangement at the growth end of the nanotube.

It has been shown from the discussed method that radio-frequency plasmas can produce carbon nanotubes, which grow on a substrate kept at a temperature below 300° C. and in particular at room temperature. This low temperature plasma enhanced CVD method is suitable for growing well-aligned carbon nanotubes selectively by using the metal catalytic effect, where the temperature at the point of CNT growth permits the use of temperature sensitive substrates.

In general, the carbon nanotubes catalytically produced tended to adopt a whisker-like form where the catalyst particle is carried away from the substrate during the growth process and remains at the tip of the nanotube. The diameter of the carbon nanotube was the same as that of the nickel particle at their head. Catalyst particles at the growing end of the nanotube were usually "pear-shaped", and completely enveloped by a layer of carbon. Moreover, each nickel particle was responsible for the growth of a single nanotube, unidirectional or bi-directional. Most carbon nanotubes produced were composed of multiple co-axial tubes with the spacing between tube walls being approximately the graphene interplanar distance of 0.34 nm. However, it is also possible to produce growth of the carbon nanotubes in coiled form.

Applications

This new method of production allows for the formation of CNTs on commercially significant materials, and growth over relative large areas. Many new CNT applications have since become available due to the large number of available materials for use as substrates on which CNTs can now be deposited because of the lower temperature process. Highly temperature sensitive materials such as plastics, or any other types of polymer, ceramics, textiles, paper, or even organic materials may now be used as materials for CNT deposition.

Examples of CNT applications available through using this method are the deposition of CNTs on to textiles for use in applying printed circuits to clothing and the reinforcement of material fibres; the production of flexible displays using CNTs; the deposition of CNTs onto living organisms, and due to the inert nature of CNTs, the application of CNT devices internally placed in living organisms. It may also be possible to use nanotubes as DNA storage devices.

An example of a possible application using this method is to insert an item of clothing such as the cuff of a shirt into a CNT deposition chamber. Prior to being inserted in to the chamber, the cuff would be coated with a nickel catalyst in a particular pattern so as to be able to form a printed circuit. The deposition of the CNTs, in-situ within the chamber, would produce a printed circuit in the same pattern as the nickel catalyst pattern deposited on the cuff. The circuit could be, for example, part of a mobile communication device enabling people to communicate with each other without having to carry mobile phones as separate devices. This method therefore provides an efficient way of depositing electrical circuits onto fabrics.

Due to the inertness of carbon it is possible to deposit CNTs on organic material, providing a wide range of suitable applications. An example of using this method on organic material is the deposition of a pacemaker circuit onto a heart prior to a transplant. Firstly a catalyst material is placed on the surface of a heart suitable for transplantation in a pattern required to form a pacemaker device. The heart is then inserted into a suitably clean chamber, and the CNTs are grown. Once the CNTs have grown, the heart is then removed and transplanted into the patient.

A further example of using this method in a new application is the deposition of CNTs onto flexible transparent sheets for use in flexible display applications. A material such as PVA (polyvinyl acetate) could be used as a substrate in the same manner as the applications discussed above.

It is also possible to use this method of forming CNTs to provide improved ceramic material products. For example, the CNTs are deposited in-situ within the chamber into ceramic powder, thereby forming a ceramic composite. The ceramic composite mixture is removed from the chamber and formed into ceramic devices. This method provides a way of reinforcing ceramic materials, and providing conductive ceramics.

A further example is to place polymer resin into the chamber and deposit the CNTs in-situ into the resin. The resultant polymer composite is then available for use as a conductive and/or reinforced material.

A further example of an application in which CNTs may be used is to form EMI (Electro Magnetic Impulse). The CNTs may be formed in a composite material (e.g. glass, metal, ceramic, polymer, graphite or any combination of these), wherein the composite material is then able to shield devices or people from RF or microwave radiation.

CNTs may also be grown on a paper substrate using the described method, whereby CNTs are deposited on a paper substrate within the chamber to form a circuit using a catalyst material. The paper circuit may then be used as a biodegradable electronic device, which is easily and cheaply manufactured, and can be thrown away when no longer required.

CNTs have special qualities such as good conductivity and resistance to temperature. Nanotubes are very stiff and sharp, whilst nanofibres are slightly more flexible. Ropes of CNTs have good tensile strength, which is useful in applications where durability and power are required. Also, as carbon is not easily detectable, it is also possible to make CNT circuits that can be hidden.

It is now possible for any of these products or devices, including the known applications discussed in the introduction, to be fabricated more economically under a less restrictive environment.

DESCRIPTION OF SECOND EMBODIMENT

A procedure for the production of carbon nanotubes using a combination of radio-frequency and microwave energy will now be discussed.

Figure 2:
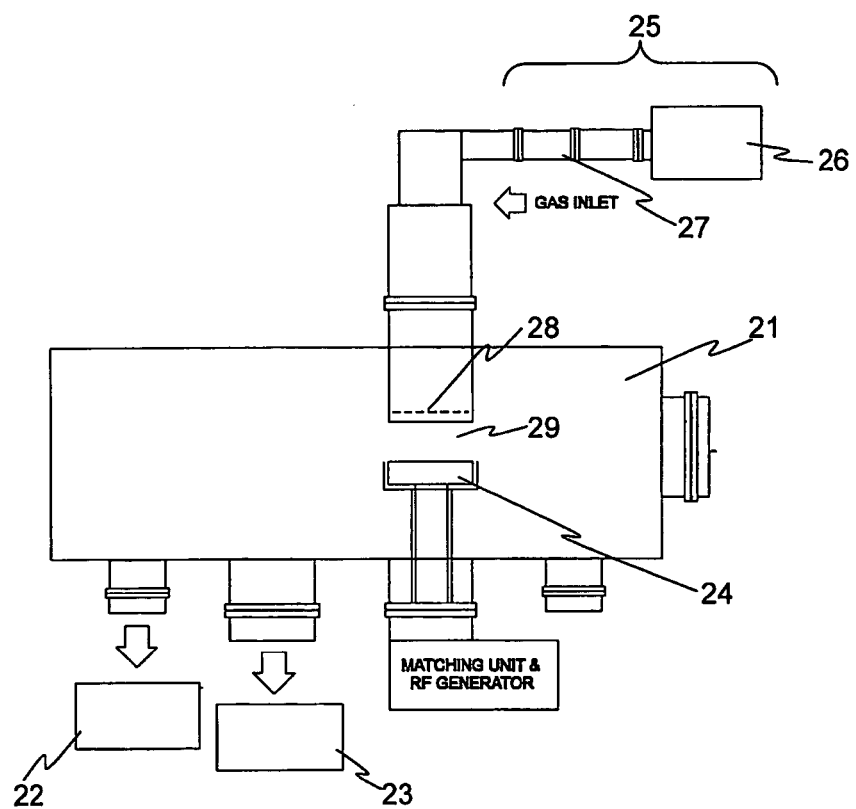
FIG. 2 shows a plasma chamber using primary and secondary power supplies, e.g. combined microwave and radio-frequency, according to an embodiment of the present invention.

Referring to FIG. 2, there is shown a chamber 21 capable of evacuation firstly via a rotary pump 22, and then after a certain pressure is reached, via a turbo pump 23. An earthed electrode 24 is shown in similar fashion to the chamber shown in FIG. 1. However, the chamber 21 is adapted to receive a microwave generator 25 consisting of a magnetron 26 and a tuner 27. The microwave generator's grid electrode 28 serves as the powered electrode for the purposes of applying radio-frequency power across the earthed electrode 24 and powered electrode 28. The microwave generator is of a type known per se and arranged to direct microwave radiation into the plasma-generating region 29. The microwave power source is used in combination with the radio-frequency power source in order to provide energy for the plasma.

In use, a substrate (not shown) such as a graphite plate is dispersed with approximately 50 mg of nickel powder catalyst as a uniform thin layer on the top of a graphite substrate. The catalyst used for carbon nanotubes growth is nickel powder (99% purity), with average particle diameter from 4 to 7 µm obtained from Goodfellow Cambridge Ltd.

The substrate is placed upon the earthed electrode 24 with the electrode 24 being water-cooled (not shown). A carbon containing gas, such as methane gas of 99.999% (five 9s) purity (obtained from BOC Ltd.) is used. The gas is introduced in to the chamber prior to switching on the radio-frequency and microwave power supplies. The gas flow rate is set to 70 sccm ($cm^3$/minute) and is maintained at a constant flow rate. Once the gas flow has started flowing into the chamber a plasma is struck, as discussed in the previous embodiment. However, in this embodiment combined radio-frequency and microwave plasma enhanced CVD is performed with radio-frequency power ranging from 100 W-200 W and microwave power ranging from 240 to 840 W. The microwave and radio-frequency plasma input power is kept constant during the CNT deposition.

Various process times were used from 15 to 30 minutes, with a process pressure of 1.6 Pascal (12 mTorr).

The carbon nanotubes form and grow from the metal catalyst particles, within the sheathed region of the plasma. The substrate was partly heated directly by the plasma without an additional heating source, however the temperature of the substrate during the CNT deposition process was recorded as 24° C.

The nanotubes of examples 9 to 13, as shown in Table 2, were grown in a combined radio-frequency and microwave plasma enhanced CVD system, as depicted in FIG. 2, using a 2.45 GHz microwave power supply. The following table (TABLE 2) shows the results of five process runs that used combined radio-frequency and microwave plasma enhanced CVD.

TABLE 2

| Example | Catalyst | Substrate | Hydrocarbon | Radio Frequency | Time | Microwave Energy | Temp |
|---|---|---|---|---|---|---|---|
| 9 | Ni powder 4-7 µm | Silicon | $CH_4$ f = 70 scm 99.9% pure | 13.56 MHz, 100 w | 15 min | 2.45 GHz 500 w | <100° C. |
| 10 | Ni powder 4-7 µm | Glass | $CH_4$ f = 70 scm 99.9% pure | 13.56 MHz, 100 w | 15 min | 2.45 GHz 840 w | <100° C. |
| 11 | Ni powder 4-7 µm | Graphite | $CH_4$ f = 70 scm 99.9% pure | 13.56 MHz, 100 w | 15 min | 2.45 GHz 240 w | <100° C. |
| 12* | Ni powder 4-7 µm | Silicon | $CH_4$ f = 70 scm 99.9% pure | 13.56 MHz, 100 w | 15 min | 2.45 GHz 840 w | <100° C. |
| 13* | Ni powder 4-7 µm | Glass | $CH_4$ f = 70 scm 99.9% pure | 13.56 MHz, 100 w | 15 min | 2.45 GHz 840 w | <100° C. |

*After treatment in 35% nitric acid for 4 minutes.

The average length of CNTs produced using combined radio-frequency and microwave power was between 0.5 and 5 $\mu$m with a thickness from 5 to 80 nm. Varying different parameters as discussed in the preferred embodiment may of course produce various different lengths and thickness of CNTs.

Bi-directional growth of CNTs grown by combined radio-frequency and microwave plasma enhanced CVD methods was observed, as grown in example 10 & 11 and shown in FIGS. 6, 7A & 7B.

FIG. 6 shows the bi-directional growth characteristics seen using the combined radio-frequency and microwave PECVD CNT deposition method. The diamond-shaped catalyst particle can be seen in FIG. 6 situated in the middle of the CNT.

In addition to the unidirectional and bidirectional morphologies, CNTs grown by the combined radio-frequency microwave PECVD method have unexpectedly shown branching during growth and "Y" and "H" shaped junctions have been formed, as shown in FIGS. 7A and 7B. The branches of a CNT growth were of the order of 20 nm in diameter, whilst the roots were of the order of 40 nm in diameter.

In FIG. 7A an SEM micrograph of the area with interconnecting networks of CNTs is shown. FIG. 7B is a magnification of the rectangular area marked in FIG. 7A.

The synthesis of connections between two or more different CNTs is an important step in the development of carbon nanotube-based electronic devices and conducting structures, by creating interconnections for electronic devices on a nanometer scale. Interconnecting networks of branched CNTs are very important for the creation of a new generation of conducting composite materials, as a network may be grown without any need to rearrange grown individual CNTs to form a network.

DESCRIPTION OF THIRD EMBODIMENT

Although the CNTs are deposited onto substrates within the chamber in the two previous embodiments, it is also possible to produce CNTs within the chamber and then apply them to a substrate that is external to the chamber. The temperature and atmospheric environment of the substrate can be easily controlled, as the substrate is not in close proximity to the plasma.

A plasma is struck as discussed in either of the previous embodiments. However, a substrate with a catalyst particle layer is not placed within the chamber prior to striking the plasma. Instead, catalyst particles are injected into the plasma area of the chamber, in which, the catalyst particles react with the plasma as discussed previously and CNTs are grown. The catalyst particles may, for example, be dissolved in a liquid such as benzene and injected into the chamber. Alternatively, an aerosol may be used to inject the catalyst.

The CNTs formed from the catalyst particles are then extracted from the chamber by any means possible. For example, a pump may direct the CNTs through a venting channel, or an electromagnetic force may be set up around the chamber directing the CNTs towards a suitable chamber exit point.

After the CNTs are collected from the chamber, they are deposited onto a substrate of choice, such as previously discussed. The CNTs are deposited onto a substrate in a predefined pattern according to the application requirements. For example, the substrates may be placed on to a moving belt, which is moved underneath a nozzle that emits CNTs, the CNTs deposited in a predetermined pattern. Alternatively, the substrates may be placed on a stationary surface, whilst the CNT emitting nozzle is moved over the top of the substrates, depositing the CNTs in the required pattern.

This method clarifies that additional heat sources are not required to heat substrates to provide the mechanism for growth of CNTs, and all that is required is a carbon containing plasma in which the catalyst particles can react.

In this method, it is not necessary to stop CNT production in order to insert subsequent substrates or groups of substrates, as in previous embodiments. Therefore, this method provides a higher throughput due to the continuous CNT production, extraction and deposition onto external substrates.

DESCRIPTION OF FOURTH EMBODIMENT

Using any of the methods described previously it is also possible to produce ropes of roughly-aligned CNTs, which have been synthesised after nickel catalysed plasma enhanced chemical vapour deposition (PECVD) of methane at substrate temperatures below 300° C., and in particular at room temperature.

After production of the CNTs using the methods described previously, the chamber is vented to atmospheric pressure and the substrate on which CNTs were deposited was removed from the chamber. The mixture of the synthesised CNTs and the remaining nickel powder catalyst was removed from the substrate and then placed in an appropriately acid proof container.

The mixture of CNTs and nickel powder was covered in a 35% nitric acid solution for 3 to 10 minutes. The mixture was then rinsed with de-ionised water to remove the nitric acid from the mixture. CNT ropes were produced in dried sediment, as seen in a scanning electron microscope (SEM) examination. Rope diameters were from 20 $\mu$m up to 80 $\mu$m, and the lengths of the ropes were up to a few millimeters.

It is thought that the CNTs were self-organised into ropes by hydrophobic adhesion in de-ionised water, which was used to discontinue nitric acid action, and bundled together by van der Waals force.

The size of these ropes can offer easy manipulation with special opportunities for their characterisation and applications, in particular the utilisation of their inherent strength.

For example, the ropes may be intertwined with fabrics to provide for a reinforced protective garment.

Ropes produced using this method may be used in composite materials (e.g. glass, metal, ceramic, polymer, graphite and any mixture thereof). Ropes may also be used in any of the applications discussed previously

DISCUSSION OF FURTHER EMBODIMENTS

Catalytic carbon nanotubes (CNT) were grown with the substrates, upon which the CNTs were formed, being kept at temperatures below 300° C., and in particular down to room temperature using radio-frequency plasma chemical vapour deposition (CVD) and combined radio-frequency microwave plasma CVD methods. Instead of using high temperatures (300° C.+) to provide an appropriate growth environment for the CNT, the present invention utilises hydrocarbon plasmas to provide the energy dynamics necessary for dissociation of the carbon and subsequent catalytic growth on transition metal particles, with a wide range of different substrates being kept at temperatures below 300° C. and in particular down to room temperature.

It will be apparent to a skilled person that the term plasma used herein embraces an ionised gas, or ionised vapour, or a collection of ionised particles. The plasma may be in the form of a beam, such as a plasma beam which can be produced e.g. by a filtered cathodic vacuum arc apparatus. The plasma can be, for example, generated by microwave energy or by radio-frequency energy or by a combination of microwave energy and radio-frequency energy. Also, it would be clear to the skilled person that ECR (electron cyclotron resonance) microwave plasma could be utilised for the growth of CNTs. As such, any type of plasma may be used and may be generated by a primary power source optionally combined with at least one secondary power source.

It will be also be apparent to a skilled person that any gaseous medium containing carbon can be used. The gaseous medium is preferably a hydrocarbon gas such as methane, acetylene or ethylene. However, any other carbon-containing gases could be used, such as, for example, carbon monoxide or carbon dioxide. The gaseous medium can also be a mixture of carbon-containing gases, or a mixture of a carbon containing gas with a carrier gas such as Nitrogen ($N_2$), Hydrogen ($H_2$), or Argon (Ar). Whichever carbon-containing gas or mixture of gases is used, it is preferred that the gas used during CNT production is nondestructive or non-etching in the plasma state. It is therefore preferred to avoid any gas which, when ionised, forms ionic species likely to adversely affect the structure or operation of the plasma chamber. However, it is possible to use ammonia ($NH_3$) as a carrier gas, where the ammonia is used to react with the catalyst.

It will also be apparent to a skilled person that it is preferred for the gaseous medium to be of high purity, for example greater than 98% pure. However, less pure gases may be used.

It will also be apparent to a skilled person that the plasma methods are preferably effected within a suitable vacuum chamber constructed to generate, maintain and withstand a gaseous plasma. Suitable plasma chambers are known per se and will not require further substantial elaboration to the notional skilled person.

It will also be apparent to a skilled person that, although in the embodiment described above the microwave power supplied was at a frequency of 2.45 GHz, the frequency used could be any frequency in the band 2 to 3 GHz.

It would also be apparent to a skilled person that, although the microwave power applied in the embodiment described above was in the range 240 W to 840 W, the power range applied could be between 20 W and 6 kW. These levels of microwave power are preferably applied and maintained throughout the period of nanotube growth required e.g. for at least 10 minutes preferably at least 15 minutes, more preferably at least 20 minutes. The maximum applied time is not especially critical and is likely to be influenced by economic factors, and the required characteristics of the nanotubes.

It will also be apparent to a skilled person that radio-frequency power may be applied alone, or combined with microwave power to provide a plasma, and that although the frequency of the radio-frequency power used in the embodiments described above was set to 13.56 MHz that any frequency in the band 90 KHz-30 MHz may be used. Also, although in the embodiments discussed above the power was set to 200 W, it will be apparent that power settings in the range 20 W-10 kW can be used.

It will also be apparent to a skilled person that the power supply unit could be a pulsed or DC power supply. If a pulsed power supply is used to generate or support the plasma, it may be of a frequency in the range 25 to 250 kHz and of a power up to about 10 kW. The plasma could be generated using a pulsed power supply combined with radio-frequency and/or microwave energy.

Although the two embodiments using radio-frequency energy alone and radio-frequency energy combined with microwave energy show substrate temperatures of 24° C. to 32° C., it will be apparent to the skilled person that any substrate temperature may be obtained by using chiller units with antifreeze to cool the substrates down, and heater units in the electrodes to heat the substrates up. For example, temperatures may be below 300° C. down to room temperature (20° C. to 35° C.), or even down to 0° C. and lower. It will also be clear to a skilled person that it may be possible to use liquid nitrogen on the substrates to produce CNTs using a hot filament PECVD method, with the substrate being kept at a low temperature.

It will be apparent to a skilled person that it is preferred for a metal catalyst to be present, for example a transition metal such as nickel, cobalt, iron, or any mixture thereof upon a substrate as previously discussed.

It will also be apparent to a skilled person that although nickel powder of 99% purity, and an average particle diameter of 4-7 μm was used in the specific embodiments that it is possible to use a less pure, or indeed a higher purity nickel powder, and varying sized particles.

Also, it will be apparent to the skilled person that the catalyst need not to be powder. It may be present as a thin metal film or as a metal film thermally treated, to form metal island arrays, for example by vacuum or inert gas annealing between 200° C. and 800° C. Alternatively, such metal film may be etched chemically or by plasma treatment, preferably plasma etched in an $NH_3$ plasma between 2-20 minutes. The metal particle size of such island arrays, preferably nickel island arrays is preferably of the order 2 to 100 nm.

It will also be apparent to a skilled person that various process pressures, gas flows & concentrations, and D.C. bias may be used during the plasma-striking stage and the deposition stage of this CNT production method.

The invention claimed is:

1. A method of forming carbon nanotubes in an apparatus by plasma enhanced chemical vapor deposition, comprising:
   (a) providing an earthed electrode and a powered electrode in a chamber of the apparatus, the earthed electrode and the powered electrode being arranged substantially parallel and being spaced apart such that a space is provided between the earthed electrode and the powered electrode;
   (b) supporting a substrate on the earthed electrode such that the substrate occupies a part of the space between the earthed electrode and the powered electrode with a surface of the substrate facing said space, and providing a catalyst on said surface of a substrate;
   (c) feeding a carbon containing gas via an inlet into the chamber;
   (d) striking a plasma from the carbon containing gas in the space between the earthed electrode and the powered electrode by applying energy to the powered electrode, wherein the energy comprises at least one of radio-frequency energy and microwave-frequency energy; and
   (e) forming carbon nanotubes from the plasma on the surface of the substrate facing the plasma, wherein the apparatus comprises a temperature control system that includes both heating elements and cooling elements, and wherein the temperature control system maintains the earthed electrode and the powered electrode at a temperature below 300° C. throughout (a)-(e), thus maintaining the substrate at said temperature.

2. A method according to claim 1, wherein the substrate is not separately heated.

3. A method according to claim 1, wherein the substrate is kept at a temperature of 200° C. or below.

4. A method according to claim 3, wherein the substrate is kept at a temperature of 150° C. or below.

5. A method according to claim 4, wherein the substrate is kept at a temperature of 100° C. or below.

6. A method according to claim 5, wherein the substrate is kept at a temperature of 50° C. or below.

7. A method according to claim 6, wherein the substrate is kept at substantially room temperature.

8. A method according to claim 1, further comprising cooling the substrate during the forming the carbon nanotubes.

9. A method according to claim 8, wherein the substrate is kept at a temperature below 0° C.

10. A method according to claim 8, further comprising cooling the substrate with liquid nitrogen.

11. A method according to claim 1, wherein the catalyst is placed directly on the substrate surface.

12. A method according to claim 1, wherein the carbon nanotubes are grown from the catalyst as deposited on the substrate.

13. A method according to claim 1, wherein the substrate is placed on an earthed electrode of a plasma generator, within the sheathed region of the plasma.

14. A method according to claim 13, wherein the potential difference between the substrate/catalyst and the plasma is less than 100 volts.

15. A method according to claim 14, wherein the potential difference between the material/catalyst and the plasma is less than 70 volts.

16. A method according to claim 15, wherein the potential difference between the material/catalyst and the plasma is less than 40 volts.

17. A method according to claim 13, further comprising cooling an electrode.

18. A method according to claim 17, wherein the electrode is cooled by water.

19. A method according to claim 1, wherein the catalyst is a metal.

20. A method according to claim 19, wherein the metal is a transition metal.

21. A method according to claim 20, wherein the transition metal includes a metal, or mixture of metals, from the group comprising nickel (Ni), cobalt (Co) and iron (Fe).

22. A method according to claim 1, wherein the catalyst is in the form of a powder, a film, or island arrays.

23. A method according to claim 22, wherein the island arrays are etched island arrays of which the particle sized is between 2 nm and 100 nm.

24. A method according to claim 1, wherein the substrate comprises a material selected from: an organic material, a fabric, a plastics material, a polymer, and paper.

25. A method according to claim 1, wherein the plasma is of an ionized gas or gas mixture, or in the form of a beam.

26. A method according to claim 1, wherein the plasma is generated by radio-frequency current and microwave-frequency current.

27. A method according to claim 1, wherein the plasma is generated using a pulsed supply.

28. A method according to claim 1, wherein the plasma is generated by a primary power source and combined with at least one secondary power source.

29. A method according to claim 1, wherein the carbon containing gas is a hydrocarbon gas.

30. A method according to claim 29, wherein the hydrocarbon gas is methane, acetylene, ethylene, or any mixture of the said gases.

31. A method according to claim 1, wherein the carbon containing gas is carbon monoxide or carbon dioxide.

32. A method according to claim 1, wherein the carbon containing gas is non-destructive and non-etching of the substrate or apparatus when in a plasma state.

33. A method according to claim 1, wherein the carbon containing gas is combined with a carrier gas.

34. A method according to claim 33, wherein the carrier gas is from the group comprising nitrogen, hydrogen, argon, and ammonia.

35. A method according to claim 1, further comprising the plasma under vacuum conditions.

36. A method according to claim 1, further comprising inserting the carbon nanotubes into a liquid to self-organise the carbon nanotubes into ropes.

37. A method according to claim 36, wherein the liquid is water.

38. A method according to claim 1, further comprising an acid treatment step for removal of excess catalyst particles.

39. A method according to claim 38, further comprising a wash step to remove the acid.

40. A method according to claim 1, wherein a proportion of formed nanotubes are in at least one of the following forms: bi-directional, branched, multiple-coaxial, coiled, or densely packed ropes of nanotubes.

41. A method of forming carbon nanotubes in an apparatus by plasma enhanced chemical vapor deposition, comprising:
 (a) providing a catalyst on the surface of a substrate, wherein the substrate is supported by an earthed electrode and a surface of the substrate faces a powered electrode;
 (b) feeding a carbon containing gas via an inlet into a chamber of the apparatus containing the substrate;
 (c) striking a plasma from the carbon containing gas in a space between the earthed electrode and a powered electrode by applying energy to the powered electrode, wherein the energy is selected from the group comprising: radio-frequency current, microwave-frequency current, and combinations thereof; and
 (d) forming carbon nanotubes from the plasma on the surface of the substrate facing the powered electrode, wherein the apparatus comprises a temperature control system that includes both heating elements and cooling elements, and wherein the temperature control system maintains the substrate at a temperature below 300° C. throughout (a)-(d),
 and wherein the method further comprises cooling the substrate during the forming the carbon nanotubes, and wherein the substrate is kept at a temperature below 0° C.

* * * * *